US008493182B2

(12) United States Patent
Hofer et al.

(10) Patent No.: US 8,493,182 B2
(45) Date of Patent: Jul. 23, 2013

(54) PHASE RANGING RFID LOCATION SYSTEM

(75) Inventors: Russell Hofer, St. Louis, MO (US);
Graham P. A. Bloy, St. Louis, MO (US)

(73) Assignee: RF Controls, LLC, St. Louis, MO (US)

( * ) Notice: Subject to any disclaimer, the term of this patent is extended or adjusted under 35 U.S.C. 154(b) by 691 days.

(21) Appl. No.: 12/580,365

(22) Filed: Oct. 16, 2009

(65) Prior Publication Data
US 2011/0090062 A1   Apr. 21, 2011

(51) Int. Cl.
*H04Q 5/22* (2006.01)
*G08C 19/16* (2006.01)
*G08B 13/14* (2006.01)

(52) U.S. Cl.
USPC ..... 340/10.1; 340/8.1; 340/12.1; 340/539.13; 340/572.4

(58) Field of Classification Search
USPC .............. 340/572.1, 825.49, 539.13, 572.7, 340/825.7, 10.1–10.6; 342/42, 44, 47, 127
See application file for complete search history.

(56) References Cited

U.S. PATENT DOCUMENTS

| | | | |
|---|---|---|---|
| 7,170,412 B2 * | 1/2007 | Knox et al. ............... | 340/572.1 |
| 7,257,418 B1 | 8/2007 | Chang et al. | |
| 7,511,662 B2 | 3/2009 | Mathews et al. | |
| 7,580,378 B2 * | 8/2009 | Carrender et al. ........... | 370/278 |
| 7,667,646 B2 | 2/2010 | Kalliola et al. | |
| 7,873,326 B2 * | 1/2011 | Sadr ........................... | 455/67.16 |
| 8,072,311 B2 * | 12/2011 | Sadr et al. .................... | 340/10.1 |
| 2005/0110674 A1 | 5/2005 | Mendolia et al. | |
| 2005/0280504 A1 | 12/2005 | Pettus | |
| 2006/0012521 A1 | 1/2006 | Small | |
| 2006/0044147 A1 | 3/2006 | Knox et al. | |
| 2006/0050625 A1 | 3/2006 | Krasner | |
| 2006/0232467 A1 | 10/2006 | Small | |
| 2007/0040739 A1 | 2/2007 | Small | |
| 2007/0041427 A1 | 2/2007 | Small | |
| 2007/0100548 A1 | 5/2007 | Small | |
| 2008/0030422 A1 | 2/2008 | Gevargiz et al. | |
| 2008/0143584 A1 * | 6/2008 | Shoarinejad et al. ......... | 342/127 |
| 2009/0224045 A1 | 9/2009 | Toda et al. | |
| 2009/0224873 A1 | 9/2009 | Puskala et al. | |
| 2009/0231140 A1 | 9/2009 | Hong et al. | |
| 2009/0237253 A1 | 9/2009 | Neuwirth | |
| 2009/0256750 A1 | 10/2009 | Mathews et al. | |
| 2010/0207738 A1 * | 8/2010 | Bloy ........................... | 340/10.3 |
| 2010/0328073 A1 * | 12/2010 | Nikitin et al. ............... | 340/572.1 |

FOREIGN PATENT DOCUMENTS

| | | |
|---|---|---|
| EP | 1462989 | 9/2004 |
| WO | PCT2009/035723 | 3/2009 |

OTHER PUBLICATIONS

Gonzalez Moreno, J: Extended European Search Report for EP application No. 08789680.9, European Patent Office, Apr. 12, 2011 (transmitted Apr. 19, 2011), Munich DE.
Extended European Search Report, related to application EP10186569.9, issued Jan. 14, 2011 by European Patent Office, Munich.
Extended European Search Report, related to application EP10186756.2, issued Jan. 14, 2011 by European Patent Office, Munich.

* cited by examiner

*Primary Examiner* — Daniel Wu
*Assistant Examiner* — Mancil Littlejohn
(74) *Attorney, Agent, or Firm* — Babcock IP, PLLC

(57) ABSTRACT

A method and apparatus for phase ranging the distance an RFID tag is from an RFID location system antenna along the interrogation signal beam, based upon the phase readings included in data sets obtained from monitoring reply signals corresponding to interrogation signals at multiple frequencies and a common interrogation signal beam direction; by comparison of measured phase and frequency data sets with theoretical phases calculated with respect to the same frequencies over a range of positions corresponding to a beam extent of the interrogation signal.

20 Claims, 7 Drawing Sheets

PHASE RANGING RFID LOCATION SYSTEM

BACKGROUND

1. Field of the Invention

The invention relates to touch free identification, location and/or tracking systems. More particularly, the invention relates to an RFID identification, location and/or tracking system utilizing Phase Ranging to determine the distance of a target RFID from the system antenna.

2. Description of Related Art

Commonly owned PCT Patent Application Publication WO 2009/035723, titled "Radio Frequency Signal Acquisition and Source Location System" by Bloy et al published Mar. 19, 2009, hereby incorporated by reference in its entirety, discloses a real-time RFID location system that utilizes an Intelligent Tracking and Control System (ITCS) coupled to one or more intelligent scanning antenna Signal Acquisition and Source Location (SASL) modules (an ITCS installation) to enable the accurate 3-dimensional location of RFID tags arbitrarily placed and/or moving through a defined target area (volume). Touch free Identification, location and/or tracking systems such as the ITCS object identification systems disclosed in WO 2009/035723 enable the identification and location of tags and/or tagged items, attributing significance to the appearance, disappearance, location or co-location of tags or tagged items and thereby facilitating better business process decisions.

A SASL steerable phased array antenna may be configured to provide highly accurate interrogation beam direction feedback, enabling identification of a vector through the volume upon which a target RFID may be located. However, ranging of the distance from the antenna to the position along the beam where the target RFID is located, to enable three-dimensional location of the target RFID within the volume, is impossible without further inputs.

When provided with further data storage/processing capabilities, an RFID location system such as disclosed in WO 2009/035723 can be further enhanced to monitor tagged and/or untagged objects via RF environmental fingerprint monitoring and analysis as disclosed in U.S. patent application Ser. No. 12/395,595, titled "Radio Frequency Environment Object Monitoring System and Methods of Use", filed Feb. 29, 2009 by Bloy, hereby incorporated by reference in its entirety.

An ITCS installation typically includes multiple SASL to provide high precision triangulation data for RFID location calculations. However, an optimal multiple SASL configuration requires a volume configured such that each of the SASL can scan the entirety of the volume from separate mounting locations. Barriers and/or products in a typical volume at any moment during use may create obstructed scanning areas for one or more of the SASL, preventing the scanning of a target RFID by at least two SASL and thus inhibiting interrogation signal beam intersection triangulation location of the target RFID. Further, costs for multiple SASL hardware, installation and maintenance may become significant.

WO 2009/035723 also discloses alternative methods for RFID range location utilizing a single SASL, such as signal transmit/receive timing, Return Signal Strength Indication (RSSI), ghost signal analysis and/or multiple signal averaging. However, location accuracy utilizing these alternative methods may be less than satisfactory where RFID location with high precision is desired.

Therefore, it is an object of the invention to provide an object monitoring solution that overcomes deficiencies in the prior art. A further object of the present invention is to facilitate ease of configuration, operation reliability and maintenance of RFID object location systems.

BRIEF DESCRIPTION OF THE DRAWINGS

The accompanying drawings, which are incorporated in and constitute a part of this specification, illustrate embodiments of the invention, where like reference numbers in the drawing figures refer to the same feature or element and may not be described in detail for every drawing figure in which they appear and, together with a general description of the invention given above, and the detailed description of the embodiments given below, serve to explain the principles of the invention.

DETAILED DESCRIPTION

Through investigation of the operational parameters of RFID object location systems, the inventors have recognized that analysis of the phase of the received signal from a target RFID over multiple interrogation frequencies can provide ranging of the target RFID distance along the interrogation signal beam with significant precision.

Phase ranging as used herein is the procedure of calculating the distance a tag is from the RFID location system antenna along the interrogation signal beam, based upon the phase readings included in the data set(s) obtained for each frequency at the same steering angle.

Figure 1:
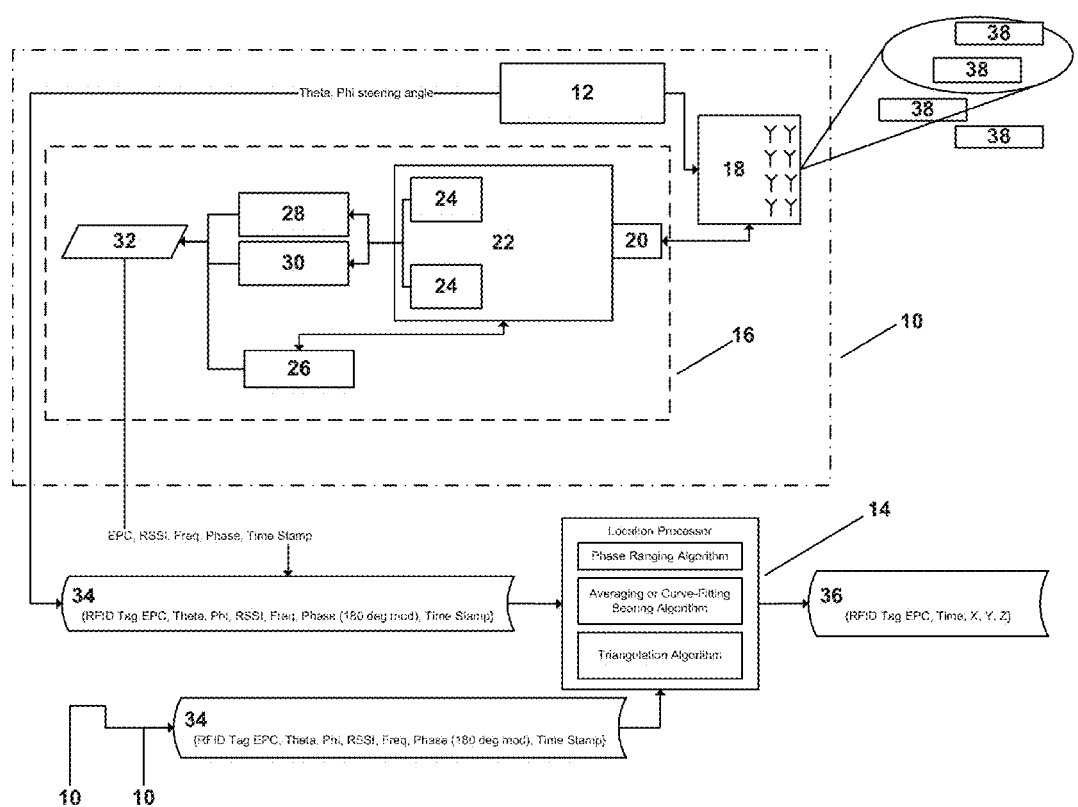
FIG. 1 is a schematic block diagram of an exemplary RFID object location system.

FIG. 1 demonstrates an exemplary RFID location system with signal phase detection and phase ranging capability. The intelligent steerable phased array antenna module 10 is demonstrated with a beam steering unit 12 under the control of a location processor 14. An RFID reader module 16 directs an interrogation signal to and receives corresponding signals from the steerable phased array antenna 18 through the RF port 20 of a multi-frequency transceiver 22. The transceiver 22 processes the desired signals through digital to analog transmit and analog to digital receive converters 24 for each of transmit and receive signal paths according to control instructions from a protocol processor 26.

The RFID reader module 16 includes a phase detection circuit 28 that provides phase data and/or determines a phase differential between a phase of the interrogation signal and the phase of the corresponding received signal. Because of ambiguity in measuring the phase information in homodyne receivers, the phase measurement result may be limited to a range of 0 to 180 degrees, the modulus of the phase of the backscatter signal at the receiver. Alternatively, phase ranging procedures described herein also accommodate an input phase of −180 to +180 (0 to 360) degrees.

Further signal analysis within the RFID reader module is performed by an amplitude processing circuit 30 and an RFID tag singulation circuit 32 whereby for each RFID tag scan an Electronic Product Code (EPC) or other tag identifier, RSSI, frequency, phase and a time stamp can be output for further processing by the ITCS and/or location processor. A supplier of an RFID reader module 16 including phase detection capability is Sirit Inc. of Toronto, Canada. Beam steering angle information such as Theta and Phi received from the beam steering unit 12 may also be associated with each RFID tag scan and a combined data set 34 representing each RFID tag scan stored at the location processor 14. Additional intelligent steerable phased array antenna module(s) 10 may also be included, each delivering a data set 34 to the location processor 14. An output 36 of the location processor 14 comprises the tag identifier, time stamp and three dimensional location of the associated RFID tag 38.

The transceiver 22 is preferably provided with frequency hopping capability to enable multiple high speed RFID tag 38 scans over a range of frequencies, for example between 902 to 928 Mhz, at the same beam steering angle, generating a data set for each frequency. Frequency hopping may be, for example with steps of 100, 250 or 500 kHz, resulting in 250, 100 or 50 steps over the frequency range. Government radio frequency regulations may require a minimum frequency hopping rate of 50 frequency changes within 20 seconds. Faster frequency changes may enable increased scanning/calculation speeds.

Figure 2:
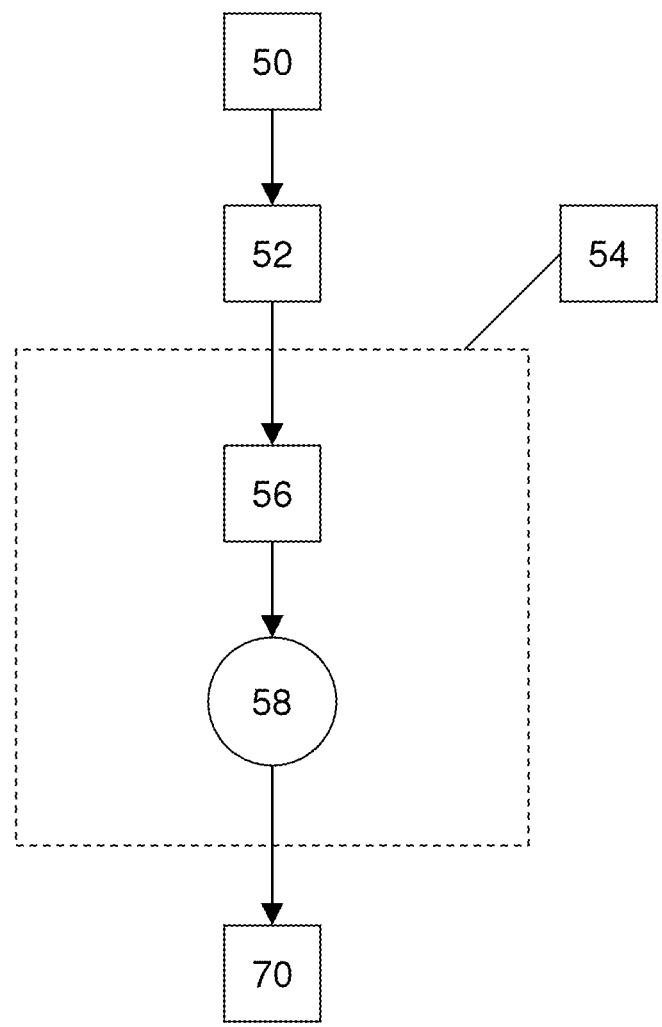
FIG. 2 is a schematic process diagram for phase ranging.

Methods for phase ranging are described in detail with the aid of a general process flow chart, as shown in FIG. 2. At 50, a plurality of data set(s) 34 are gathered by directing the interrogation signal beam through a scan of the volume. The scan may be for example a raster scan or other sweep pattern, for example prioritized by prior data identifying the locations of RFID tag(s) 38. The scan may be performed at a single scan frequency, interrupted upon reception of a reply signal from an RFID tag 38 whereupon a plurality of readings are repeated over a range of different frequencies along the same beam direction. Alternatively, the scan may be performed with continuous frequency hopping, enabling application of maximum signal strength with applicable governmental RF transmitter regulations.

As the interrogation signal beam encounters an RFID tag 38, a reply signal is received by the antenna identifying the presence of the RFID tag along the beam that triggers a data capture of the data set 34 corresponding to the RFID tag scan, for example: an Electronic Product Code (EPC) or other tag identifier, RSSI, frequency, phase and a time stamp. Further interrogation signals along the same beam are performed at additional frequencies, recording a data set 34 for each interrogation signal frequency. The phase of the rf component of the, for example backscatter modulation, reply signal is included in each data set 34. As the interrogation signal frequency is varied, the phase of the received reply signal will change. The data set(s) 34 may be grouped by tag identifier, creating a data matrix for further processing, including deriving the three dimensional position of each RFID tag 38.

In a further embodiment, an RF environmental fingerprint according to U.S. patent application Ser. No. 12/395,595 may be associated with each of the data set(s) 34.

One skilled in the art will appreciate that the number of different interrogation signal frequencies applied to a single beam direction/RFID tag data set gathering directly impacts the resolution of the resulting distance calculation, in a tradeoff with the additional time required to switch to, generate and process data for each interrogation signal frequency applied.

To apply phase ranging to the RFID tag scan data, for a beam direction at which an RFID tag 38 has been detected, the beam extent or a shorter segment of interest of the beam extent at the instant direction is derived, at 52.

Figure 3:
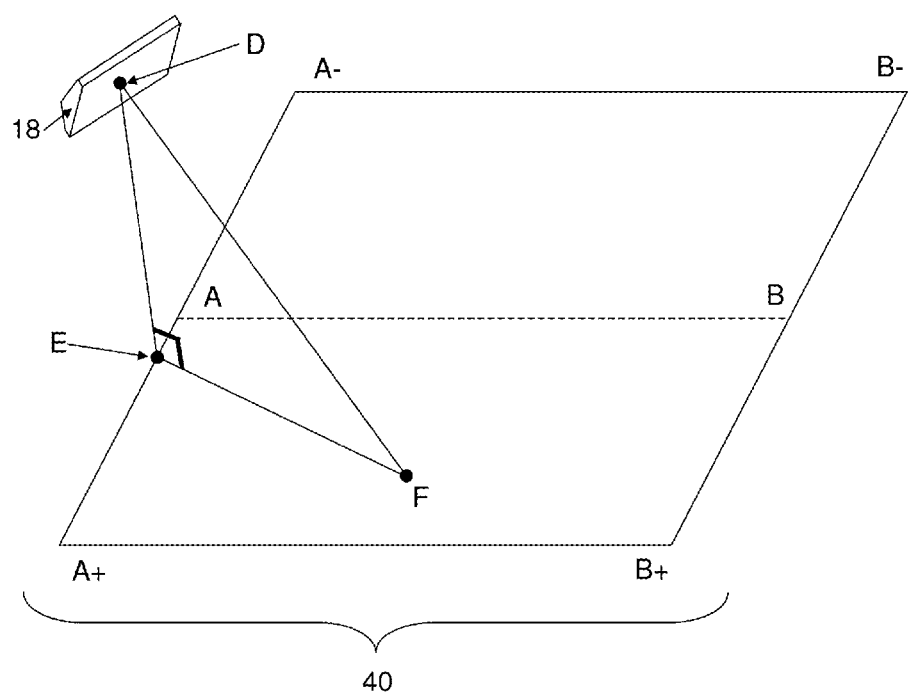
FIG. 3 is a schematic diagram demonstrating a beam extent within a volume perimeter.

In a typical installation, a perimeter of the volume 40 is specified and the position of the antenna 18 with respect to the volume 40 is also known. For any beam angle the intersection of the beam with the perimeter of the volume 40 such as the floor and/or sidewalls may be calculated by trigonometry. The floor and/or sidewalls may be physical or logical portions and/or barriers, including for example the perimeter of desired exclusion area(s) from which it is known that RFID tag(s) 38 will be excluded and/or that identify locations wherein RFID tag 38 tracking is not desired. Once the co-ordinates of the endpoint of the beam have been calculated, the beam length may also be calculated. For example as shown in FIG. 3, when the beam is swept in azimuth A− to A+ (i.e from left to right) and successively moved in elevation towards B, a raster scan of the floor covering a volume defined by A−, A+ to B−, B+ is performed. At any instance during the scan a right angle triangular figure may be drawn comprising a vertical line from a point D at the centre of the antenna dropping perpendicular to the floor to point E, a line running from D to a point of intersection with the floor F representing the centre of the antenna interrogation beam, and a horizontal line along the floor connecting E and F. As the beam is swept across the floor the length of the line DF, the beam extent, will vary as will the included angle of intersection DF and EF.

The ends of the beam extent identified at 52 may be referenced as MIN and MAX, representing the minimum distance and the maximum distance, respectively, that the present RFID tag 38 is expected to be from the antenna, along the present beam direction.

Further refinements may be applied that reduce overall processing times and also improve noise immunity. For example, the distances of MIN and MAX may be reduced to a high probability range by utilizing signal timing and/or RSSI data of the data sets to reduce the theoretical length of the beam extent. If signal timing indicates a short or long period between launch of the interrogation signal and reception of the backscatter modulation from the target RFID tag a segment of the beam extent closer and/or farther away from the antenna 18 may be prioritized for examination. Similarly, if the RSSI reading is higher and/or lower, this may be interpreted as an indication that the range of possible locations of the target RFID along the signal beam is closer and/or farther away.

Figure 4:
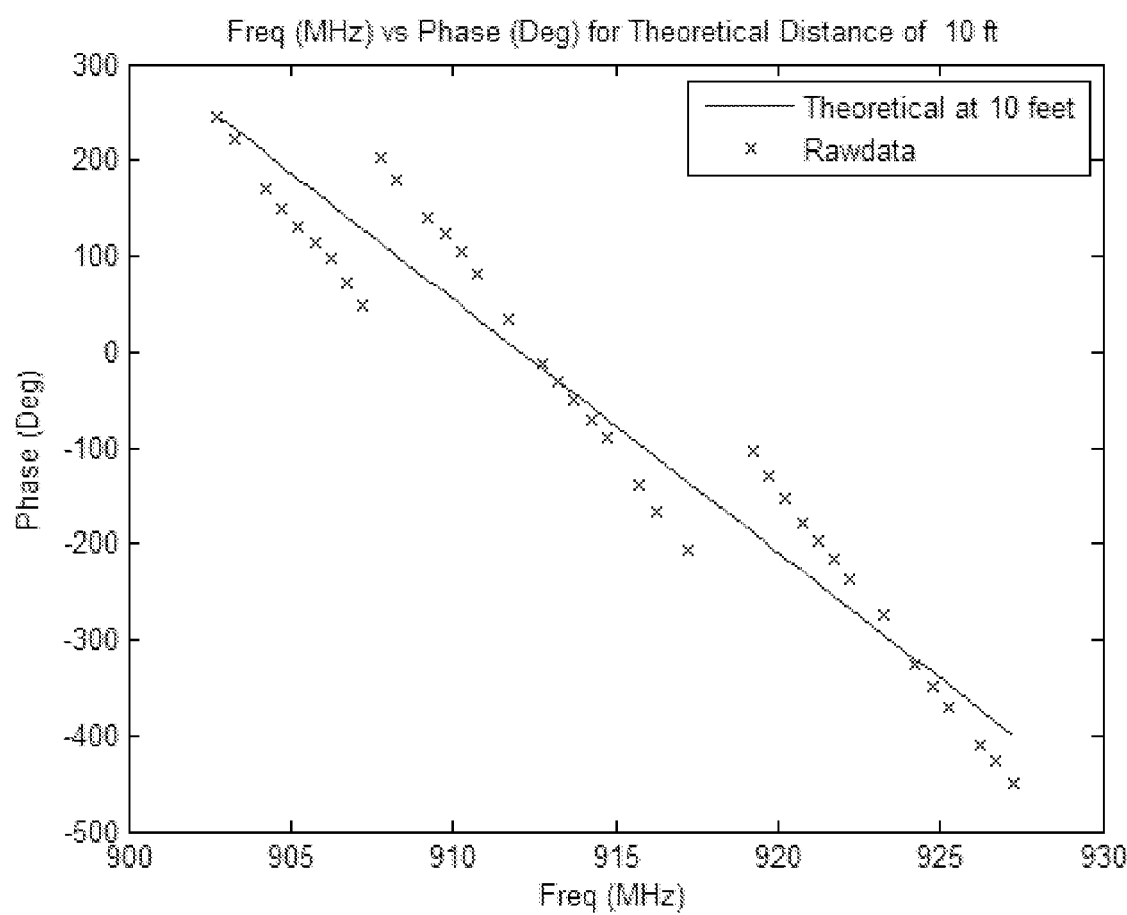
FIG. 4 is a chart of exemplary phase data over a range of frequencies with a theoretical phase line overlay, calculated for a distance of 10 feet.

Phase ranging along the beam extent is performed at 54. Because the tag distance from the antenna 18 along the signal beam is not known to begin with, an arbitrary distance is assumed, such as the MIN, MAX, a midpoint or other function of the present beam extent. In this example, an exemplary distance of MIN=10 feet is selected. As output by the RFID reader module, the recorded phase information is the modulus of 180 degrees. As the data set(s) are plotted with respect to phase and frequency, as shown in FIG. 4, it will be noticed that there are three lines of data spaced 180 degrees apart at their origin. This is because, the phase is recorded with reference to the initial frequency phase result and subsequent phase measurements are adjusted by adding or subtracting multiples of 180 degrees if they deviate from the theoretical phase (see below) by more than 90 degrees. Thereby, the phase is adjusted so that the result best agrees with the theoretical phase reading.

Theoretical phase=phase at min Freq−(freq(Hz)−min Freq)*distance(ft)*360(deg)/c(ft/s)*2

At 56, the signal processor generates a theoretical dataset comprising the phase of a backscatter signal for each frequency and for a set of theoretical tag distances in the range of MIN to MAX. This theoretical line, data points calculated for example by calculating theoretical phase for a range of distances is shown in FIG. 4 for the assumed tag distance of 10 feet. It will be noticed that the theoretical line has a different slope than the actual phase measurements of the tag. The origin of the theoretical line may be selected as the first phase versus frequency data set co-ordinates taken so that the origins of the actual raw data and the theoretical lines coincide, which simplifies calculations.

At 58, the signal processor performs an iterative loop on the data set(s) 34 of each detected RFID tag in order to determine a best fit to the theoretical phase, which identifies the distance of the RFID tag along the signal beam from the antenna 18. Instead of calculating the theoretical distance/overlay slope differential associated with each available frequency data set 34 in sequence, comparisons between representative theoretical distances corresponding to the available range of frequency data sets(s) 34 may be made to identify a converging theoretical distance range of interest, for example via slope comparison and/or plus/minus indication of the slope differential from the theoretical result for the associated distance, wherein the available frequency data set(s) 34 within the converging theoretical distance range are then reviewed for best fit.

Figure 5:
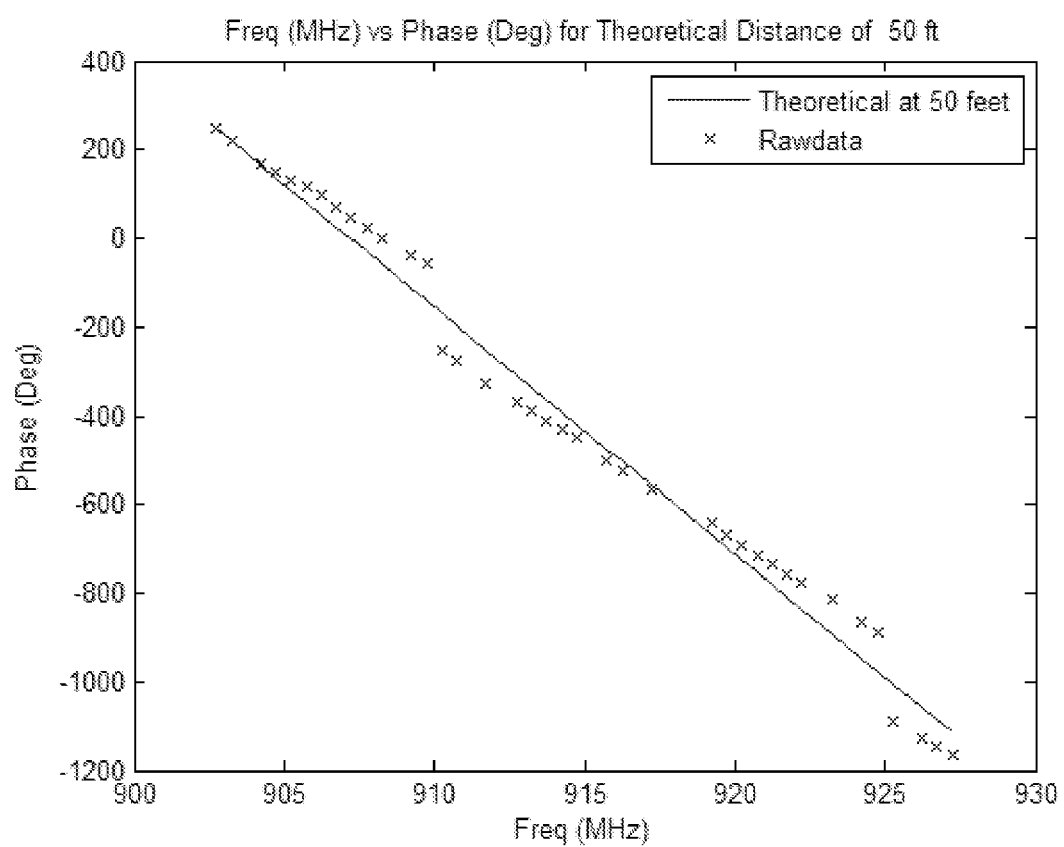
FIG. 5 is a chart of exemplary phase data over a range of frequencies with a theoretical phase line overlay, calculated for a distance of 50 feet.
Figure 6:
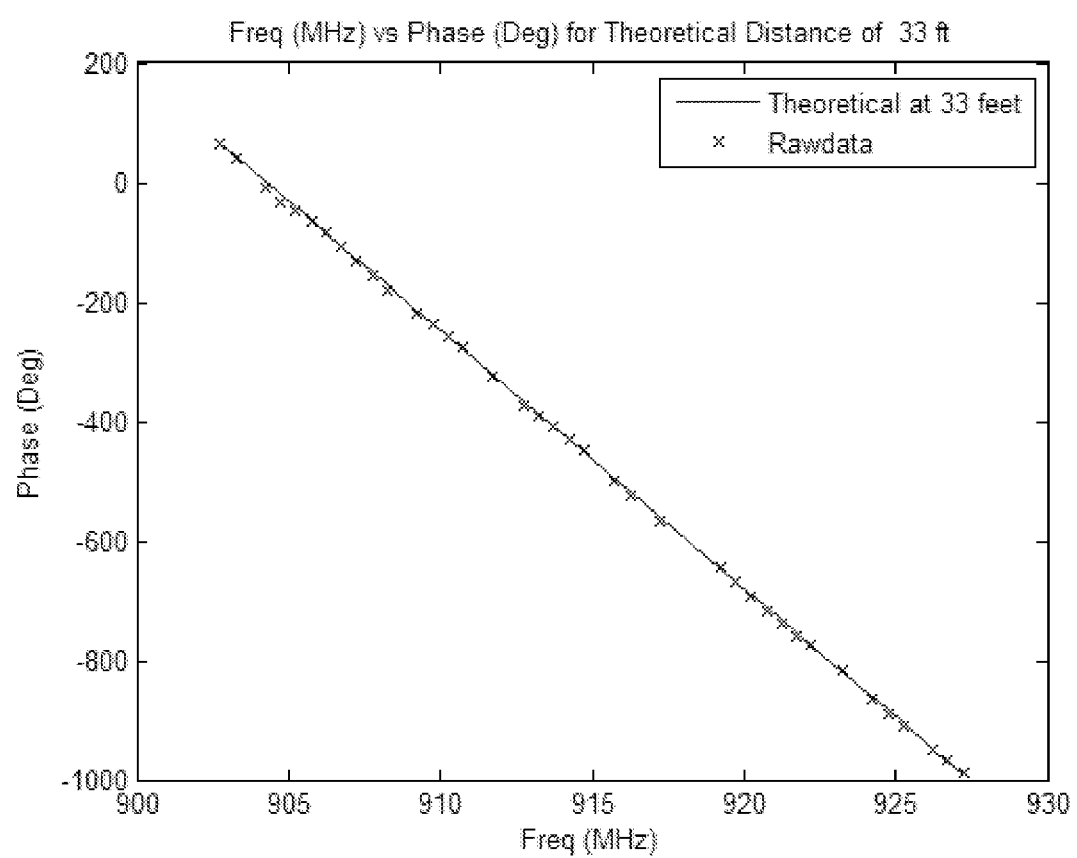
FIG. 6 is a chart of exemplary phase data over a range of frequencies with a theoretical phase line overlay, calculated for a distance of 33 feet.

The iterative loop generates the theoretical line with respect to each of a number of distances between MIN and MAX. As demonstrated by FIGS. 4, 5 and 6, if the actual distance is greater than the theoretical distance, then the slope of the recorded data will be greater than the theoretical and if the actual distance is less than the theoretical distance, then the slope will be less (more shallow) than the theoretical.

The recorded data is then overlaid on the theoretical data for each distance step. At some distance the slope of the recorded data and the slope of the theoretical data will at least be parallel and will typically coincide provided that the origins of both are the same. In the present data set example, this is demonstrated in FIG. 6. Therefore, in the present example the distance of the RFID tag along the signal beam from the antenna 18 is 33 ft, the theoretical distance applied to generate FIG. 6, the best slope fit of the data set(s) 34 provided in this example. At 70, the theoretical distance with the best slope fit is selected as the output distance.

In a refinement of the iterative method to speed up the location process, a converging iterative process may be used whereby the theoretical distance is first calculated for a distance less than the assumed distance of the tag and then for a distance greater than the assumed distance of the tag. By comparing the slopes of the data set between the measurements, it is possible to exclude numerous data set 34 calculations and rapidly converge on the actual distance using known mathematical techniques.

Figure 7:
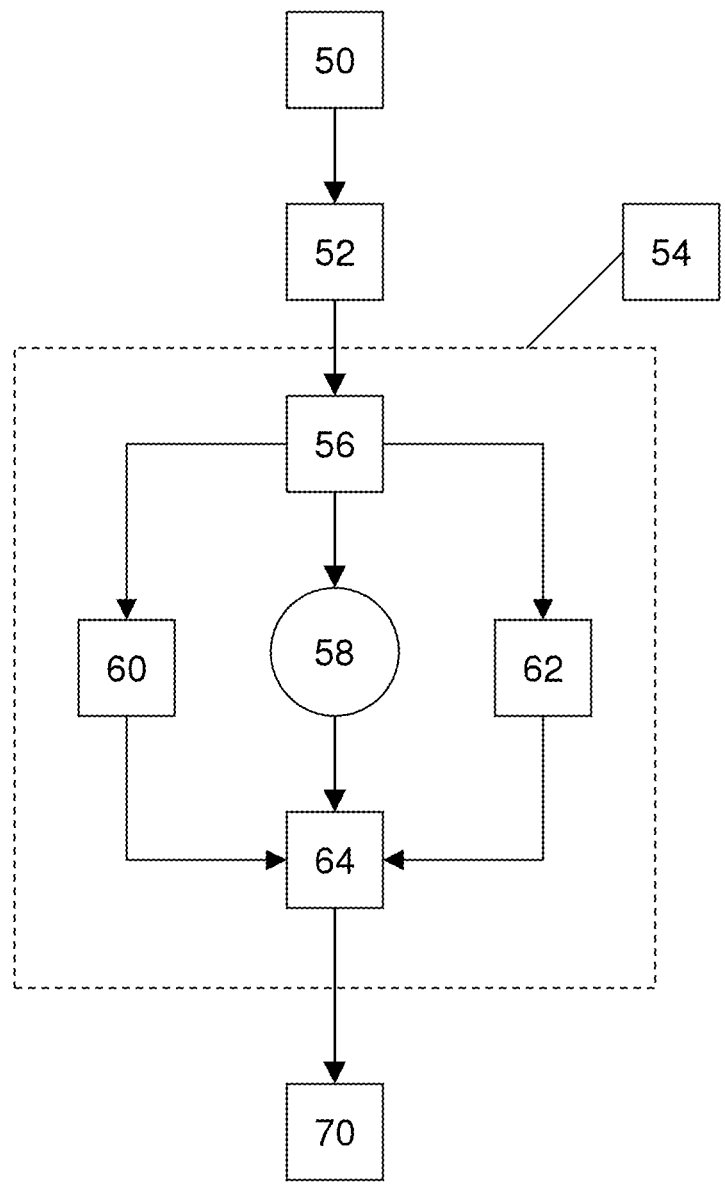
FIG. 7 is a schematic process diagram for phase ranging, including distance result validation.

In further embodiments, for example as shown in FIG. 7, validity of the resulting output distance obtained from phase ranging may be tested via additional verification steps. A verification of the result may be performed at 64, operating upon the result of data integrity calculations performed at 60 and 62. For speed of execution, these calculations may be performed in parallel with the best fit processing in 58. In 60, a Sum of Square Error (SSE) value is calculated by taking the theoretical phases and subtracting each from the corresponding measured data between MIN and MAX, squaring, and summing across all measurements. In 62, a Sum of Square Total (SST) is calculated with respect to a horizontal line (slope=0, indicating a distance of 0) by taking the 'theoretical phase', subtracting it from the adjusted raw data, squaring, and summing across all measurements. With the SSE and SST inputs from 60 and 62, an R_rawData(64) may be calculated by:

$$R\_rawData(64) = 1 - SSE/SST$$

Where an R_rawData(64) approaching 1 is indicative of a good fit and an R value approaching 0 is a poor fit. An error source in the calculations may be the presence of RF noise sources, an RFID tag 38 that was moving during data acquisition and/or the broad phase averaging applied as the data set 34 is generated. For ease of decision making, a Threshold_R_rawData value may be designated.

At 70 if: R_rawData(64)>Threshold_R_rawData, the phase ranging result is accepted and a corresponding three dimensional position of the subject RFID tag 38 is output from the location processor 14 with the associated tag identifier and a time stamp. If R_rawData(64) fails to be greater than the Threshold_R_rawData, an alternative best guess, for example according to the procedures disclosed in WO 2009/035723 and/or an alarm may be output. Also, where multiple intelligent steerable phased array antenna module(s) 10 are providing data set(s) 34 to the location processor 14, the results of these separate phase ranging calculations may be compared as a further check. Where processing speed is not critical, multiple scan and calculation loops may be performed along the same beam direction to further verify the result and/or provide data for averaging of the resulting 70 distance output to generate a final result with an improved confidence level.

When scanning for multiple RFID tag(s) 38, the processes described may take place for each RFID tag 38 found when a single beam direction has identified multiple RFID tag(s) 38, separated into unique data set(s) 34 by the tag singulation circuit 32 of the RFID reader module 16.

The phase ranging procedure has been described herein with respect to data gathered at a single interrogation signal beam direction. Because the interrogation signal beam has a generally conical aspect with a cross sectional area that varies with distance, an individual RFID tag 38 may be detected at multiple beam directions where the cross sectional area of the beam(s) overlap. To improve system response times, data set(s) 34 associated with multiple beam directions may also be utilized. To correct for phase differences resulting from the slightly different beam directions, a correction factor, for example determined during system configuration, may be added to the measured phase depending upon RSSI comparisons and/or mapping of adjacent beam direction data set(s) 34 that indicate which beam direction appears to be the center-point of the target RFID tag 38 location.

One skilled in the art will appreciate that the apparatus and systems disclosed provide significant equipment, installation and maintenance advantages over prior multiple antenna 18 triangulation and/or significant improvements in location precision compared to single antenna 18 tag location systems without phase ranging capability.

| Table of Parts | |
|---|---|
| 10 | intelligent steerable phased array antenna module |
| 12 | beam steering unit |
| 14 | location processor |
| 16 | RFID reader module |
| 18 | antenna |
| 20 | RF port |
| 22 | transceiver |

-continued

Table of Parts

| 24 | converter |
| 26 | protocol processor |
| 28 | phase detection circuit |
| 30 | amplitude processing circuit |
| 32 | tag singulation circuit |
| 34 | data set |
| 36 | output |
| 38 | rfid tag |
| 40 | volume |

It will be appreciated by those skilled in the art that the invention is not restricted to the embodiments described herein but it may be applied to other similar applications involving the tracking, tracing and location of objects or items using RFID tags or other radio frequency transponders. Where in the foregoing description reference has been made to ratios, integers, components or modules having known equivalents then such equivalents are herein incorporated as if individually set forth.

While the present invention has been illustrated by the description of the embodiments thereof, and while the embodiments have been described in considerable detail, it is not the intention of the applicant to restrict or in any way limit the scope of the appended claims to such detail. Additional advantages and modifications will readily appear to those skilled in the art. Therefore, the invention in its broader aspects is not limited to the specific details, representative apparatus, methods, and illustrative examples shown and described. Accordingly, departures may be made from such details without departure from the spirit or scope of applicant's general inventive concept. Further, it is to be appreciated that improvements and/or modifications may be made thereto without departing from the scope or spirit of the present invention as defined by the following claims.

We claim:

1. An RFID location system, comprising:
    an RFID reader module coupled to a steerable phased array antenna directed by a beam steering unit;
    the RFID reader module outputting a data set including a tag identifier, a frequency and a phase;
    the RFID reader module including a transceiver with multiple frequency transmit and receive capability;
    a location processor receiving the data set and a beam direction parameter;
    the location processor outputting a three dimensional location of an RFID tag associated with the tag identifier.

2. The system of claim 1, wherein the data set further includes a return signal strength indicator and a time stamp.

3. The system of claim 1, wherein the location processor is configured for phase ranging processing upon the data set.

4. A method for phase ranging in an RFID location system, comprising the steps of:
    directing an interrogation beam through a scan of a volume with a steerable phased array antenna;
    receiving a reply signal from an RFID tag when the interrogation signal beam is pointed in a direction along which the RFID tag is located;
    generating a data set corresponding to the reply signal including a phase and a frequency of the reply signal;
    alternating the frequency between a plurality of frequencies and generating further data sets for each of a plurality of reply signals corresponding to the plurality of frequencies;
    generating a theoretical phase with respect to each of the frequencies at each of a plurality of distances along the beam;
    comparing a slope of a line through the theoretical phases at each of the frequencies at each of the plurality of distances with a slope of a line through the phase at each of the frequencies at each of the plurality of distances; and
    selecting the distance at which the slope of the line through the theoretical phase with respect to each of the frequencies is closest to the slope of the line through the phase with respect to each of the frequencies as an output distance.

5. The method of claim 4, wherein a beam extent of the interrogation signal beam is determined; and the plurality of distances are each within the beam extent.

6. The method of claim 5, wherein the beam extent is determined with respect to a position of an antenna transmitting the interrogation signal beam and the direction of the interrogation signal beam.

7. The method of claim 5, wherein the beam extent is determined with respect to a position of an antenna transmitting the interrogation signal and the direction of the interrogation signal beam within a perimeter of a volume.

8. The method of claim 5, wherein the perimeter of the volume includes a logical portion.

9. The method of claim 4, wherein the phase in each of the data sets is a modulus of 180.

10. The method of claim 4, wherein each of the data sets further includes a tag identifier.

11. The method of claim 4, wherein each of the data sets further includes a return signal strength identifier.

12. The method of claim 4, wherein each of the data sets further includes a time stamp.

13. The method of claim 4, wherein the theoretical phase is generated by the equation:
    theoretical phase =phase at min Freq−(freq(Hz)-min Freq) *distance(ft)* 360(deg)/c(ft/s)*2,
    wherein phase at min Freq is the phase corresponding to a minimum frequency of the data sets; Freq is the frequency corresponding to the frequency for which the theoretical phase is being calculated; distance is a distance for which the theoretical phase is being calculated and c is the speed of light.

14. The method of claim 4, further including the step of verifying the output distance by generating an R_raw Data =1 —SSE/SST; where SSE is a sum of square error obtained by subtracting each of the theoretical phase from the phase corresponding to each frequency of the data set and subtracting each from the corresponding measured data, squaring, and summing across all measurements; and SST is a sum of square total calculated with respect to a theoretical line of slope zero.

15. The method of claim 14, wherein the R_rawData is compared to a Threshold_R_rawData and the output distance is accepted if the R_rawData is greater than the Threshold_R_rawData.

16. The method of claim 4, further including the step of outputting the output distance as a three dimensional co-ordinate.

17. A method for phase ranging in an RFID location system, comprising the steps of:
    receiving a reply signal from an RFID tag when an interrogation signal beam at a frequency is pointed in a direction;

determining a beam extent of the interrogation signal;
generating a data set corresponding to the reply signal including a phase and a frequency of the reply signal;
alternating the frequency between a plurality of frequencies and generating further data sets for each of a plurality of reply signals corresponding to the plurality of frequencies;
generating a theoretical phase =phase at min Freq −(freq (Hz)−min Freq)* distance(ft)*360(deg)/c(ft/s)*2, with respect to each of the frequencies at each of a plurality of distances along the beam, within the beam extent;
  wherein phase at min Freq is the phase corresponding to a minimum frequency of the data sets; Freq is the frequency corresponding to the frequency for which the theoretical phase is being calculated; distance is a distance for which the theoretical phase is being calculated and c is the speed of light;
comparing a slope of a line through the theoretical phases at each of the frequencies at each of the plurality of distances with a slope of a line through the phase at each of the frequencies at each of the plurality of distances; and selecting the distance at which the slope of the line through the theoretical phase with respect to each of the frequencies is closest to the slope of the line through the phase with respect to each of the frequencies as an output distance.

18. The method of claim 17, further including the step of verifying the output distance by generating an R_rawData = 1−SSE/SST; where SSE is a sum of square error obtained by subtracting each of the theoretical phase from the phase corresponding to each frequency of the data set and subtracting each from the corresponding measured data, squaring, and summing across all measurements; and SST is a sum of square total calculated with respect to a theoretical line of slope zero.

19. The method of claim 18, wherein the R_rawData is compared to a Threshold_R_rawData and the output distance is accepted if the R_rawData is greater than the Threshold_R_rawData.

20. The method of claim 17, wherein the beam extent is determined with respect to a position of an antenna transmitting the interrogation signal beam and the direction of the interrogation signal beam within a perimeter of a volume.

* * * * *